United States Patent Office 2,727,889
Patented Dec. 20, 1955

2,727,889

FRACTIONATION OF ALGINIC ACID SULFATE

Harvey E. Alburn, Springfield Township, Montgomery County, Pa., assignor, by mesne assignments, to American Home Products Corporation, New York, N. Y., a corporation of Delaware No Drawing. Application April 19, 1951,
Serial No. 221,951

10 Claims. (Cl. 260—209.6)

This invention relates to the fractionation of alginic acid sulfate salts disclosed but not claimed in my co-pending patent application for "Improvement in Alginic Acid Sulfate Production," Serial No. 163,073, filed May 19, 1950, of which this application is a continuation-in-part, now Patent No. 2,638,469.

In U. S. Patent No. 2,508,433 to Eric G. Snyder for Alginic Acid Sulfate Anti-Coagulant, a process is disclosed for producing alginic acid sulfate and its salts for use as a blood anti-coagulant. This process involves precipitating and drying the commercial alginic acid, sulfating it with an appropriate sulfating agent, and recovering the desired salt, e. g. the sodium salt, from the sulfation mixture.

Alginic acid and its derivatives are polymeric materials and like most such materials contain molecules of differing degrees of polymerization. In a material of a given average molecular weight, molecular species of both lower and higher molecular weight will be present in varying ratios, depending on the starting material and on the conditions of sulfation. In this application, when alginic acid, alginic acid sulfate or their salts are mentioned, these terms are intended to include such assemblages of molecular species of various degrees of polymerization.

Since molecules of varying molecular weight appear to have varying physiological effect, variations in molecular weight distribution sometimes result in batches of undesirable toxicity-to-therapeutic-effect ratio.

Greatly improved constancy of product having a satisfactory ratio of therapeutic-to-toxic dosage can be attained by limiting and controlling the molecular weight distribution.

A significant portion of the high molecular weight material can be eliminated by depolymerizing the alginic acid before sulfation or the alginic acid sulfate after sulfation.

I have found that relatively accurate control of the molecular-weight-range of the product can be obtained by fractionating the depolymerized materials, and according to my invention the best fractionation can be effected by fractionally precipitating the sulfated alginic acid salt from its water solution by the addition of portions of a suitable organic precipitating agent.

The alginic acid may be made from the edible grade of sodium alginate by dissolution in about 75 parts of water, precipitation by about 1.6 parts of 1:1 hydrochloric acid, washing with water to pH 2.5–3.0 and air drying.

The depolymerization can be carried out in a variety of ways, for example by heating moist commercial alginic acid, by treating an aqueous solution of sodium alginate with ascorbic acid and slowly adding hydrogen peroxide, by heating a suspension of alginic acid in 90% formic acid, by refluxing moist alginic acid suspended in pyridine, or by heating a suspension of alginic acid in water containing a small amount of dissolved calcium chloride or other activating agent such as hydrochloric acid or boric acid, at or near the boiling point.

I then sulfate the partially depolymerized alginic acid. I can accomplish this by treating a suspension of dry alginic acid in a lower aliphatic alcohol, preferably methanol, with concentrated sulfuric acid and isolating the alginic acid sulfate from the sulfation mixture; or I can add partially depolymerized alginic acid to a cooled mixture of chlorosulfonic acid and dry pyridine and isolate the pyridinium salt of alginic acid sulfate from the mixture. This crude pyridinium salt of alginic acid sulfate may be extracted with 1:1 aqueous acetone, dissolving the desired fraction and leaving unsulfated alginic acid and some high-polymer material in the residue. I then neutralize the solution of alginic acid sulfate resulting from the alcoholic sulfuric acid sulfation or the solution of the pyridinium salt of alginic acid sulfate resulting from the chlorosulfonic acid sulfation with a suitable basic reagent to form the soluble sodium, potassium or ammonium salts, the less soluble calcium salt or the still less soluble heavy metal salts. However, for normal therapeutic use I prefer to form the sodium salt by neutralizing with NaOH.

At this stage of the process I have a solution containing a soluble salt of alginic acid sulfate of varying molecular weight and the salt formed by the neutralization of the sulfation mixture. I can then dialyze said solution to remove the inorganic salts and some of the low molecular weight material. This can be conveniently carried out in a counter-current dialyzer making use of cellophane diaphragms.

According to my invention I now selectively precipitate the alginic acid sulfate salt by the addition of portions of a lower aliphatic, neutral, oxygen-containing organic liquid precipitant in which the oxygen is present in a non-ester type of linkage which is miscible with water and in which the alginic acid sulfate salt is insoluble. Examples of precipitants that have been found suitable are the lower alcohols such as methanol, ethanol and isopropanol; the ketones such as acetone and methyl ethyl ketone; the glycols such as ethylene and propylene glycol; the polyalcohols such as glycerine; the alcohol ethers such as carbitol, cellosolve and methyl cellosolve; and mixtures of any of these.

The action of these precipitants has been found to be much improved by the presence of a fairly appreciable amount of an inorganic salt, especially in regard to the consistency of extent of precipitation per unit precipitant added, the completeness of precipitation, and the physical characteristics of the precipitate.

To prevent the introduction of undesirable metallic ions into the solution and to effect the best fractionation, I prefer to use sodium chloride in the form of a 9 to 1 organic-precipitant-water solution saturated with sodium chloride. Alternatively, the sodium chloride could be added directly to the alginic acid sulfate solution in one or more portions before or during the fractionation. However, the 90% solution of organic precipitant saturated with sodium chloride provides enough salt to aid the precipitation yet limiting the amount present at any one time so that there will be no precipitation of excess salt along with the alginic acid sulfate salt and eliminating the need for careful control of the amount to be added at the various stages of the fractionation.

Having first assayed the solution of alginic acid sulfate for toxicity and activity, I can then by adding portions of the precipitating solution, precipitate a predetermined first fraction of higher-molecular-weight material, e. g. from 5 to 30% of the total, which is separated and discarded and then a middle fraction of desirable material, e. g. 30% to 60% of the total, discarding the remainder of the solution containing only low molecular species of insufficient therapeutic activity. Alternatively, after the initial precipitation of the high-molecular-weight material, I can dialyze the solution remaining, thus removing the insufficiently active low-molecular-weight material and then precipitate the middle fraction which will have a desirable anticoagulant-to-toxicity ratio and an extremely low content of very high and very low-molecular-weight material.

Alternatively, the depolymerization can be carried out after the sulfation of the alginic acid, in which case the fractionation will follow the depolymerization instead of the sulfation.

Example 1

A 10% solution of the sodium salt of alginic acid sulfate is prepared. This is done by partially depolymerizing alginic acid, sulfating it by reacting it with chlorosulfonic acid in pyridine, converting the pyridinium salt of alginic acid sulfate formed to the soluble sodium salt by neutralizing with NaOH, dialyzing the solution, and adjusting the concentration to 10% of the sodium alginic acid sulfate salt.

The anti-coagulant activity in rabbits and the $LD_{50}$ in mice of this solution is then determined. If the ratio of anti-coagulant-activity-to-toxicity is too low, a small fraction, e. g. 5%, of the higher-molecular-weight material will be removed and the anti-coagulant-toxicity ratio will be redetermined. If said ratio is still too low for therapeutic use, another fractionation is indicated. In this way the assay of the original solution will indicate the size of the fraction of higher-molecular-weight material to be removed.

To the solution of the sodium salt of alginic acid sulfate is slowly added a solution of 9:1 ethylene-glycol-water (volume/volume) saturated with sodium chloride (NaCl content—7.4%). Samples are removed at intervals to determine the amount precipitated. About 10% of the solids, i. e. the higher-molecular material, is precipitated first and discarded. Then 50–60% of the solids is precipitated as the usable fraction and the balance of lower-molecular-weight material is also discarded.

By the use of this method, alginic acid sulfate sodium salt can be produced with satisfactory consistency and constancy of anti-coagulant-effect-to-toxicity ratio.

Example 2

To a solution of 140 g. of alginic acid sulfate sodium salt in 2740 ml. of water prepared as in Example 1, was added 46 ml. of saturated NaCl solution. 928 ml. of acetone was added to bring down a first fraction and 2000 ml. more of acetone to bring down the second fraction. The fractions were washed and dried. The first fraction weighed 22 grams, had an $LD_{50}$ of 1700 mg./kg. with mice and gave an elevated clotting time of 195 minutes at a dosage of 5 mg./kg. in rabbits. The second fraction weighed 83.6 grams, had an $LD_{50}$ of 1800 mg./kg. with mice and gave an elevated clotting time of 105 minutes with rabbits at the same dosage level.

Example 3

Since there is a direct relationship between viscosity and the average molecular weight of a particular solution of the sodium salt of alginic acid sulfate, the extent of the difference between the viscosities of any two fractions is a measure of the effectiveness of the particular precipitant as an agent for the fractionation of such solutions into molecular weight fractions having higher or lower therapeutic-to-toxic effect ratios.

In the following examples, the difference in viscosity between a first and second precipitated fraction indicates the utility of the precipitants used for such a fractionation.

A 10% solution of alginic acid sulfate sodium salt containing 1% sodium chloride was made up. While stirring 100 ml. portions of said solution, 35 ml. of one of each of the precipitants tried was added slowly to each portion of solution. The precipitate in each case was filtered off and a second 35 ml. portion of the same solvent was added. The two precipitated fractions in each case were washed with ethanol and acetone and dried. 5% solutions (on a dry basis) were then made up in 0.5 M NaCl solution and the viscosities determined relative to the salt solution.

The results are as follows:

| Solvent | Relative Viscosity | | Percentage change in (Rel. viscosity−1) |
|---|---|---|---|
| | 1st fraction | 2nd fraction | |
| Methyl Cellosolve | 2.627 | 1.895 | 45 |
| Cellosolve | 2.116 | 1.734 | 34 |
| Methyl ethyl ketone | 2.274 | 1.758 | 40 |
| Methanol | 2.567 | 1.862 | 45 |
| Iso-propanol | 2.336 | 1.409 | 69 |

To one 50 ml. portion of a 10% solution of alginic acid sulfate sodium salt in water was added 55 ml. of a solution of 9:1 carbitol-water saturated with NaCl and to another portion was added 55 ml. of a 9:9:2 solution of ethylene glycol-acetone-water saturated with NaCl. The precipitate in each case was filtered off and a second fraction was precipitated from each by the addition of 100 ml. of acetone. 5% solutions were prepared and viscosities taken as above.

The results are as follows:

| | | | Percent |
|---|---|---|---|
| Carbitol | 1.534 | 1.150 | 71 |
| Acetone+ethylene glycol | 1.572 | 1.375 | 34 |

To 50 ml. of a 10% solution of alginic acid sulfate sodium salt in water was added 75 ml. of a 9:1 glycerine-water solution saturated with NaCl. The precipitate was filtered off and another portion of the glycerine solution was added. The two precipitated fractions were treated as above.

| Solvent | Relative Viscosity | | Percentage change in (Rel. viscosity−1) |
|---|---|---|---|
| | 1st fraction | 2nd fraction | |
| Glycerine | 2.438 | 1.831 | 43% |

The above results all indicate effectiveness to a greater or lesser extent of useful fractionating agents.

I claim:

1. The method of selectively precipitating molecular-weight fractions of partially depolymerized alginic acid sulfate salts from their aqueous solutions which comprises adding to said solutions portions of a neutral water-miscible organic liquid precipitant containing oxygen in a non-ester type of linkage, in which said salt is substantially insoluble, and separately collecting said fractions.

2. The method according to claim 1 in which the precipitant is ethylene glycol.

3. The method according to claim 1 in which the precipitant is acetone.

4. The method according to claim 1 in which the precipitant is carbitol.

5. The method according to claim 1 in which the precipitant is ethanol.

6. The method of selectively precipitating molecular-weight fractions of partially depolymerized alginic acid sulfate salts from their aqueous solution comprising adding to said solution in the presence of dissolved inorganic salts portions of a neutral water-miscible organic liquid precipitant containing oxygen in a non-ester type of linkage, in which said salt is substantially insoluble, and separately collecting said fractions.

7. The method according to claim 6 in which the inorganic salt is sodium chloride.

8. The method of selectively precipitating molecular-weight fractions of partially depolymerized alginic acid sulfate salts from their aqueous solutions, comprising adding to said solutions portions of an aqueous solution comprising a dissolved inorganic salt and a neutral water-miscible organic liquid precipitant containing oxygen in a non-ester type of linkage in which said salt is substantially insoluble, and separately collecting said fractions.

9. The method according to claim 8 in which the inorganic salt is sodium chloride.

10. The method of selectively precipitating molecular-weight fractions of partially depolymerized alginic acid sulfate salts from their aqueous solutions comprising adding to said solutions portions of 90% ethylene glycol-water solutions saturated with sodium chloride, and separately collecting said fractions.

References Cited in the file of this patent

UNITED STATES PATENTS

| | | |
|---|---|---|
| 2,508,433 | Snyder | May 23, 1950 |
| 2,638,469 | Alburn | May 12, 1953 |
| 2,638,470 | Alburn | May 12, 1953 |